(12) United States Patent
Cohen et al.

(10) Patent No.: US 7,181,400 B2
(45) Date of Patent: Feb. 20, 2007

(54) METHOD AND APPARATUS TO PROVISION A NETWORK APPLIANCE

(75) Inventors: Paul M. Cohen, Beaverton, OR (US); Christopher A. Meredith, Beaverton, OR (US); Ronald J. Child, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 1153 days.

(21) Appl. No.: 09/839,388

(22) Filed: Apr. 20, 2001

(65) Prior Publication Data

US 2002/0156636 A1  Oct. 24, 2002

(51) Int. Cl.
*G10L 11/00* (2006.01)
*H03R 3/00* (2006.01)

(52) U.S. Cl. .............. 704/275; 381/110; 367/198
(58) Field of Classification Search ............ 700/94; 704/270, 275; 381/110; 455/563; 709/223, 709/224, 225, 226; 367/198
See application file for complete search history.

(56) References Cited

U.S. PATENT DOCUMENTS

| | | | | |
|---|---|---|---|---|
| 5,668,928 A | * | 9/1997 | Groner | 704/243 |
| 5,819,175 A | * | 10/1998 | Niemi | 455/418 |
| 6,295,391 B1 | * | 9/2001 | Rudd et al. | 382/313 |
| 6,321,199 B1 | * | 11/2001 | Theimer et al. | 704/275 |
| 2003/0095673 A1 | * | 5/2003 | Colmenarez et al. | 381/110 |

* cited by examiner

*Primary Examiner*—Xu Mei
(74) *Attorney, Agent, or Firm*—Kacvinsky LLC

(57) ABSTRACT

A method and apparatus to provision a network node such as a network appliance is described.

5 Claims, 3 Drawing Sheets

METHOD AND APPARATUS TO PROVISION A NETWORK APPLIANCE

BACKGROUND

A network typically comprises a plurality of network nodes connected together by a communications medium. A network node may comprise, for example, a switch, router, personal computer, server, network appliance or any other network device. Each time a network node is connected to a network, the network node may need to be configured with some network information, such as a network address, control codes and so forth. This is typically performed using an input device attached to the network node, such as a keyboard, a keypad, a touch pad, a touch screen, a pointing device and so forth.

Conventional input devices for use with a network node, however, may be unsatisfactory for a number of reasons. For example, in many instances the network nodes may be located within a relatively confined area, such as a vertical storage rack. This minimizes the amount of available space for use of conventional input devices. Further, some conventional input devices may require a user to enter a significant amount of information to configure each network node. This may occur, for example, whenever the input device uses a limited number of physical keys and a hierarchical menu structure. The user may have to traverse many levels of the menu structure to enter the desired network information. This may be tedious and time-consuming work, particularly if a relatively large number of network nodes require such configuration.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
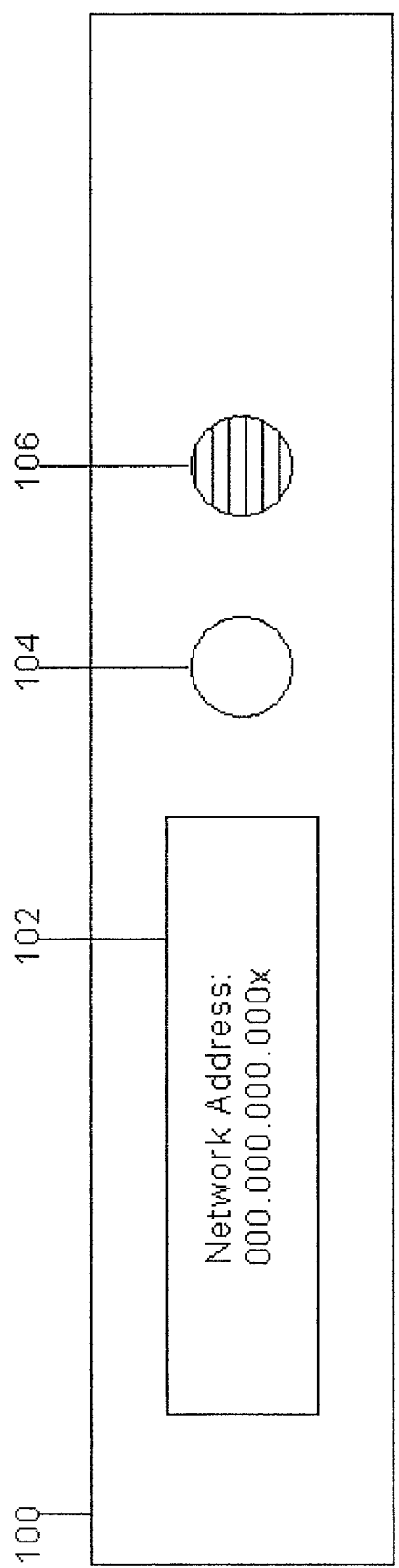
FIG. 1 is a front view of a network node suitable for use with one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

The embodiments of the invention comprise a method and apparatus to enter information into a network node, such as a switch, router, personal computer, server, network appliance or any other network device. In one embodiment of the invention, the network node may be a network appliance that may operate with an input device. The term "input device" as used herein may refer to any hardware or software used to enter information into a network node. In one embodiment of the invention, the input device may comprise, for example, an activation component, a microphone, a display, and software components to include a configuration component and a speech recognition component.

In one embodiment of the invention, a user may initiate the entering of information into a network node by selecting a parameter using the activation component. The term "activation component" as used herein may refer to hardware or software used to select a parameter. The term "parameter" as used in this context may comprise a set of information for use by the network node, such as a network address, a device name, one or more control codes, a unique device identifier, a pass code, security information, and any other information needed by the network node to perform its intended function. In one embodiment of the invention, the activation component may be a button. A user may select a desired parameter by pressing the button a predetermined number of times. In other words, each parameter may be assigned to a predetermined number of button presses. For example, assume a network address parameter corresponds to three button presses. The user could press the button three times and select the network address parameter for configuration. Once the desired parameter is selected, the user may then provide a value for the parameter. The term "value" as used herein may include any combination of numbers, letters and symbols comprising a set of information for a parameter. In the above example using a network address parameter, the value may be a network address. The user may provide the value by verbally speaking the value into the microphone. The microphone may receive the analog voice signals generated by the user, and use the speech recognition software to determine the value from the analog voice signals. The value may be sent to the visual display for visual confirmation. The confirmed value may then be associated and stored with the selected parameter.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a front view of a network node suitable for use with one embodiment of the invention. FIG. 1 illustrates a network node 100 comprising a display 102, a button 104 and a microphone 106. It can be appreciated, however, that these elements are shown as an example and are not meant to limit the embodiments of the invention. Additional configurations incorporating additional elements, removing elements, or combining different elements may be used and still fall within the scope of the invention. For example, in one embodiment of the invention a plurality of buttons may be used with the input device.

Figure 2:
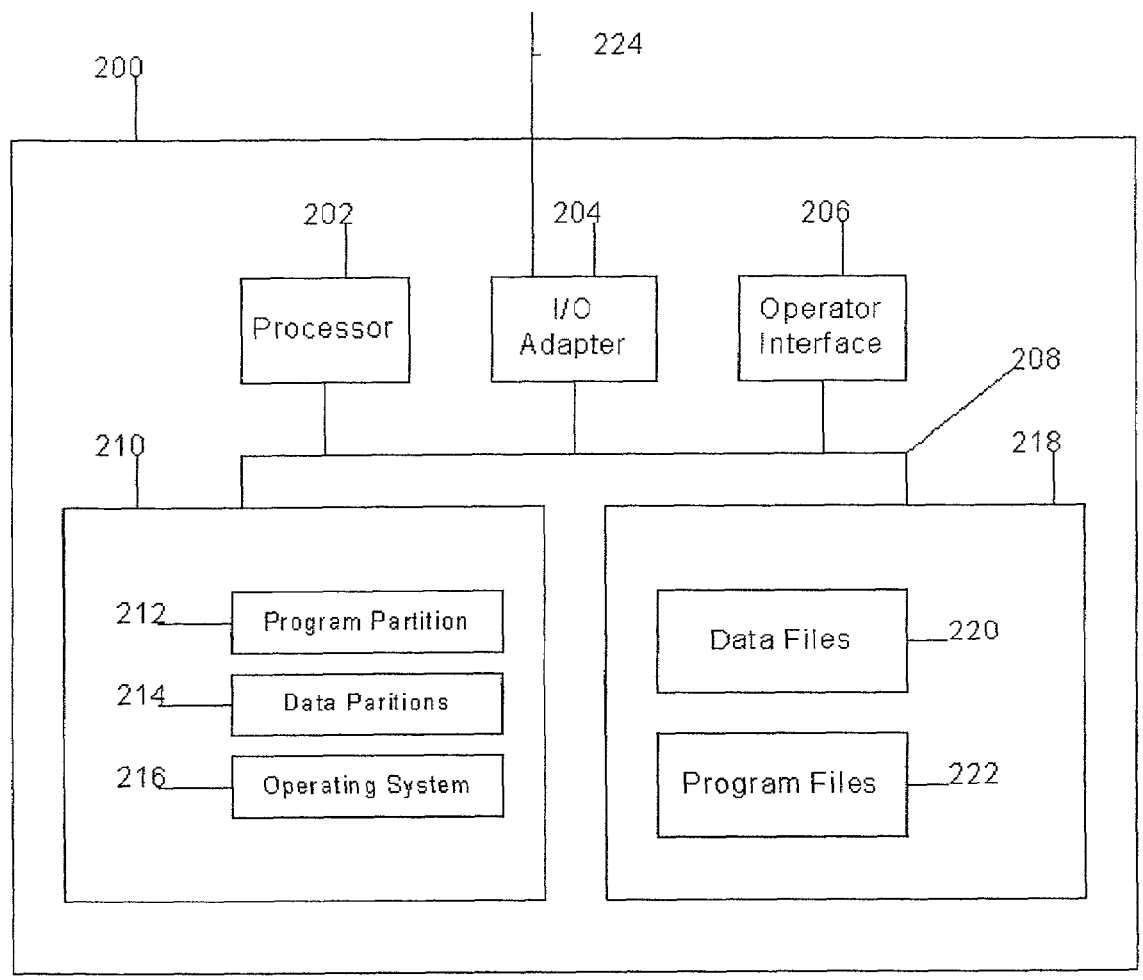
FIG. 2 is a block diagram of an input system in accordance with one embodiment of the invention.

FIG. 2 is a block diagram of a system in accordance with one embodiment of the invention. As shown in FIG. 2, an input system 200 may comprise a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include Java, C, C++ and assembly. Processor 202 executes the program instructions, and processes the data, stored in memory 210. Disk storage 218 stores data to be transferred to and from memory 210. I/O adapter 204 communicates with other devices and transfers data in and out of the computer system over connection 224. Examples of other devices may include a microphone and display, such as microphone 106 and display 102, respectively. Operator interface 206 may interface with a system operator by accepting commands and providing status information. All these elements are interconnected by bus 208, which allows data to be intercommunicated between the elements.

Processor 202 can be any type of processor capable of providing the speed and functionality required by the embodiments of the invention. For example, processor 202 could be a processor from family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. In one embodiment of the invention, operating system 216 may comprise an operating system (OS) sold by Microsoft Corporation, such as Microsoft Windows® 95, 98, 2000 and NT, Sun Microsystems Inc. and Virginia Linux Systems, Inc., for example. Program partition 212 stores and allows execution by processor 202 of program instructions that implement the functions of each respective system described herein. Data partition 214 is accessible by processor 202 and stores data used during the execution of program instructions.

In one embodiment of the invention, program partition 212 contains program instructions that will be collectively referred to herein as a configuration component and a speech recognition component. Although this embodiment of the invention uses two components, it can be appreciated that the functionality performed by these components may be combined into fewer components, or separated into additional components, and still fall within the scope of the invention.

I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org", although the embodiments of the invention are not limited to this context. I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

The operations of systems 100 and 200 may be further described with reference to FIG. 3 and its accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
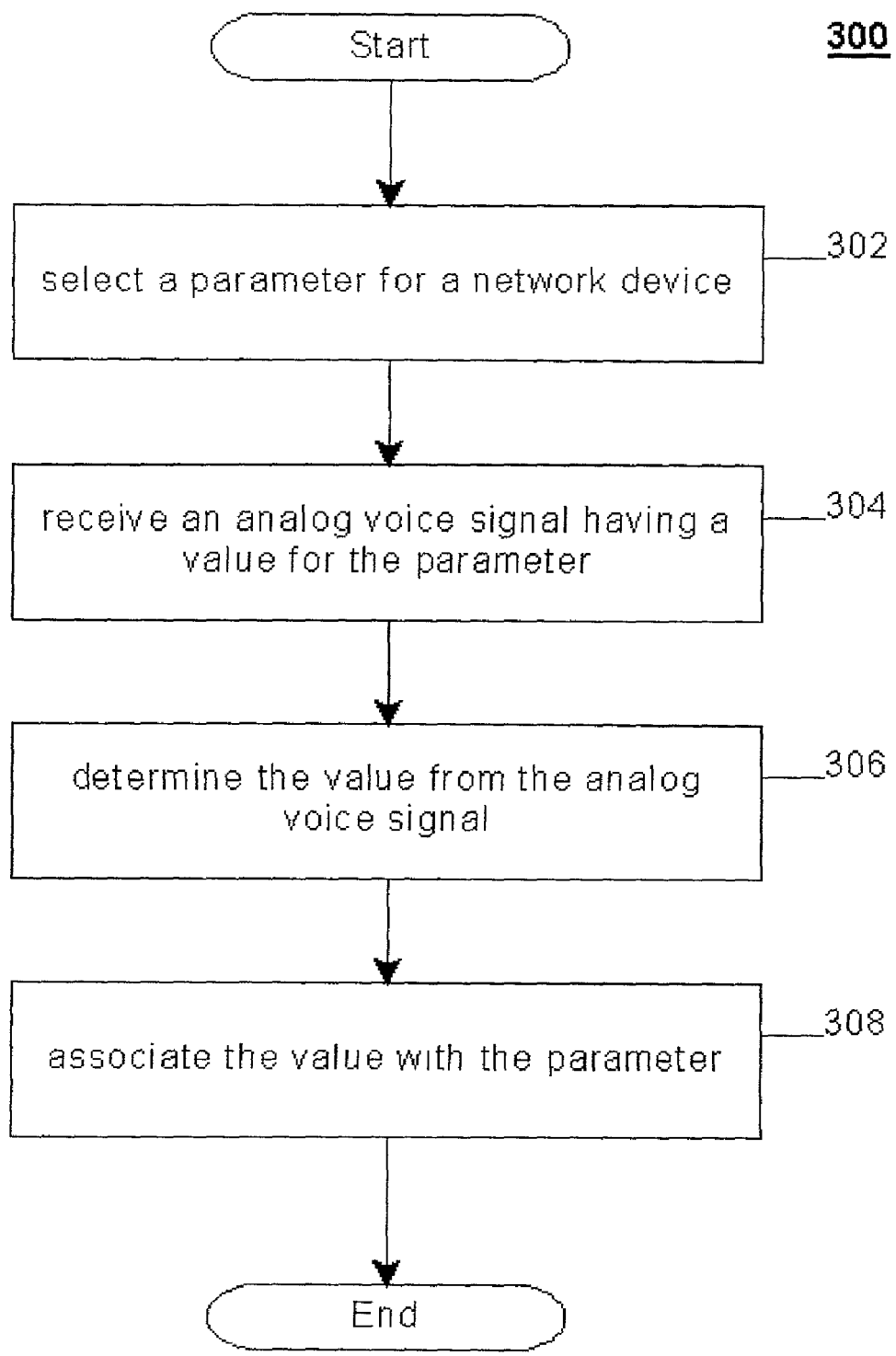
FIG. 3 is a block flow diagram of operations performed by an input device in accordance with one embodiment of the invention.

FIG. 3 is a block flow diagram of the programming logic performed by an input system in accordance with one embodiment of the invention. As shown in FIG. 3, a parameter may be selected at block 302. An example of a parameter may include a network address. The network address may be, for example, an IP address in accordance with the TCP/IP Specification. An analog voice signal having a value for the parameter may be received at block 304. The analog voice signal may comprise, for example, the words, numbers and phrases spoken by a human. The value may be determined from the analog voice signal at block 306. This may be performed by, for example, the speech recognition component of input system 200. The determined value may be associated with the selected parameter and stored in memory.

The selecting performed at block 302 may be accomplished a number of different ways. For example, input system 200 may include an activation component that is used to select a parameter. In one embodiment of the invention, the activation component may comprise a button such as button 104. Input system 200 may receive a signal for each time the button is pressed or activated. Each press of the button may generate a signal. Input system 200 may keep a count of the number of times the signal is received, and select the parameter corresponding to the number. Additional examples of an activation component may include, for example, any type of selection device, such as a plurality of buttons, switches, knobs, rotation devices, touch screen, touch pad and so forth.

In one embodiment of the invention, the activation component may include the speech recognition module to retrieve a parameter name or number, and the configuration module to select the parameter corresponding to the retrieved parameter name or number. The user may select a parameter by speaking a parameter identifier such as a number or parameter name. Once the parameter is selected, the user may speak the value for the selected parameter. In this embodiment of the invention, the user could program a network node completely using voice commands.

In yet another embodiment of the invention, the network device may be configured to perform automatic selection during an initialization or configuration process. Whenever a network device is attached to a network for the first time, the network node may automatically initiate a configuration process. The term "automatically" as used herein may refer to performing a function without human action or intervention to initiate the function. In this embodiment of the invention, the input system 200 may be configured to prompt for audible user input for various parameters in a predetermined sequence. The user may also initiate the configuration process manually using the input device as well.

In yet another embodiment of the invention, the input device may include a knob that may be rotated to select a number from an available set of numbers, with each number representing a parameter. In another embodiment of the invention, the knob may be rotated with a predetermined amount of rotation to display a parameter identifier, such as a number or parameter name, on a display such as display 102.

Once a parameter has been selected at block 302 and a value entered at block 304, input system 200 may send the determined value to a display, such as display 102. In this manner, a user may be able to perform a visual confirmation that the intended value was correctly entered into input system 200. The user may indicate confirmation of the displayed value verbally by speaking a predefined command word or phrase such as "confirmed," or manually using the activation component.

The speech recognition component may use any type of speech recognition technology, including speech dependent and speech independent technology. Speech dependent technology typically requires some training to recognize speech for a particular user to account for the user's unique speech characteristics, such as pronunciation, dialect, voice inflections, tones, tone length, and so forth. Speech independent technology typically operates independent from a particular speaker, and makes certain assumptions regarding speech characteristics. Depending on the set of information required for recognition by a particular embodiment of the invention, either or both forms of speech recognition may be appropriate. Any type of language may be implemented as part of the speech recognition component depending on a desired user.

The operation of system 100 and the flow diagram shown in FIG. 3 may be better understood by way of example. In this example, a network node may comprise a network appliance having an activation component comprising a button, such as button 104. Once the network appliance is connected to the network, a user may desire to configure the network appliance with a network address and device name, for example. The network address may be a network address for the network node being configured, or another network node to communicate with the configured network node such as a default gateway, next hop router, network address translation (NAT) server, port address translation (PAT) server, proxy server, virtual private network (VPN) gateway, and so forth. In this example, a network address parameter may correspond to one (1) press of the button, while a device name parameter may correspond to two (2) presses of the button. The user may select the network address parameter by pressing the button one (1) time. The configuration module of input system 200 would count a single signal and understand that the user selected the network address parameter. Once the user selects the network address parameter, the user may speak the numbers comprising a value for the network address parameter, which in this example would be an IP network address of "000.000.000.000x." If a subnet mask is needed, the configuration module may be configured to accept both a network address and subnet mask for the network address parameter, or a separate parameter may be defined for the subnet mask portion of the network address. Once the user speaks the numbers comprising the IP network address, a microphone such as microphone 106 would received analog voice signals and send these signals to the speech recognition component. The analog voice signals may be converted to digital signals prior to being received by the speech recognition component. The speech recognition component may determine the numbers comprising the IP network address from the digital signals using conventional speech recognition techniques. Once the numbers have been determined, the speech recognition component may send the determined IP network address to the configuration module. The configuration module may then store the determined IP network address with the network address parameter in a lookup table in memory. The configuration module may also send the determined IP network address to a display such as display 102 for confirmation by the user. Confirmation may be determined by receiving a predetermined verbal acknowledgment such as "confirmed" from the user, or a press of the button.

Once the network address parameter is configured, the user may press the button twice to select the device name parameter. The user could then repeat the process described above to configure a value for the device name parameter with a device name such as "Node 1."

In one embodiment of the invention, the system may be capable of colleting the network information during system initialization. Since system initialization may require several minutes, the system bios may be modified to accept network information during this initialization period. This could be accomplished after the system has been given adequate time (e.g., 1 minute) to initialize the various system components, such as the network interface cards, memory, processor and so forth, but prior to completion of the initialization process.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to enter information, comprising:
 selecting a parameter for a network device;
 receiving an analog voice signal having a value for said network parameter;
 determining said value from said analog voice signal;
 associating said value with said parameter; and
 wherein said selecting comprises:
  receiving a signal for each time a button is activated;
  counting a number of times said signal is received; and
  selecting said parameter corresponding to said number.

2. A method to provision a network appliance, comprising:
 selecting a parameter by counting a number of times a key is pressed;
 receiving voice information with a value for said parameter;
 retrieving said value from said voice information;
 displaying said retrieved value; and
 associating said retrieved value with said parameter.

3. An article comprising:
 a storage medium;

said storage medium including stored instructions that, when executed by a processor, result in selecting a parameter for a network device, receiving an analog voice signal having a value for said network parameter, determining said value from said analog voice signal, and associating said value with said parameter; and wherein the stored instructions, when executed by a processor, further result in selecting said parameter by receiving a signal for each time a button is activated, counting a number of times said signal is received, and selecting said parameter corresponding to said number.

4. An article comprising:

a storage medium; said storage medium including stored instructions that, when executed by a processor, result in provisioning a network appliance by selecting a parameter by counting a number of times a key is pressed, receiving voice information with a value for said parameter, retrieving said value from said voice information, displaying said retrieved value, and associating said retrieved value with said parameter.

5. The article of claim 4, wherein the stored instructions, when executed by a processor, further result in storing said value with said parameter.

* * * * *